United States Patent

[11] 3,582,011

| | | |
|---|---|---|
| [72] | Inventor | John B. W. Murray<br>White Rock, British Columbia, Canada |
| [21] | Appl. No. | 816,651 |
| [22] | Filed | Apr. 16, 1969 |
| [45] | Patented | June 1, 1971 |
| [73] | Assignee | Gearmatic Co. Ltd.<br>North Surrey, British Columbia, Canada |

[54] QUICK RELEASE DRUM CABLE ANCHOR
10 Claims, 4 Drawing Figs.

[52] U.S. Cl. ..................................... 242/117,
242/125.1
[51] Int. Cl. .................................... B65h 75/28
[50] Field of Search ......................... 242/117,
125.1, 77.3, 77.4, 77, 107, 125, 118; 254/Dig. 11,
Dig. 14

[56] References Cited
UNITED STATES PATENTS

| 1,461,052 | 7/1923 | Simpson ........................ | 242/117 |
| 1,913,508 | 6/1933 | Phillips ........................ | 242/117 |
| 2,584,099 | 1/1952 | Harkrader .................... | 242/125.1 |
| 2,860,006 | 11/1958 | Schonrock .................. | 242/117 |

Primary Examiner—George F. Mautz
Attorney—Seed, Berry & Dowrey

ABSTRACT: A cable drum is cut away to provide a drum pocket to receive enlargement such as a ferrule on the end of a cable. The drum pocket is set at an angle with respect to the departure line of the cable from the drum so that the spring tension of the bent cable maintains the ferrule in the drum pocket. Opposed shoulders on the drum pocket and a cable departure slot leading therefrom maintain the ferrule in the drum pocket until the cable is completely unwound from the drum and quick release is required.

PATENTED JUN 1 1971   3,582,011

INVENTOR.
JOHN B. W. MURRAY
BY Seed, Berry & Dowrey
ATTORNEYS

QUICK RELEASE DRUM CABLE ANCHOR

The present invention relates to cable drums generally, and more particularly to a cable drum formed with a quick release cable anchor.

In many applications which require the winding or unwinding of a cable on a drum, it is necessary to accomplish a quick release of the cable from the drum when the stored cable is completely unwound and the end of the cable is reached. This is particularly true in the case of winches and similar power-winding equipment, where quick cable release is often an important safety requirement. However, it is also important that quick cable release does not occur until the end of the cable is actually reached during the unwinding of cable from the drum. Otherwise cable fouling and damage to the equipment is likely to occur.

It is a primary object of the present invention to provide a novel and improved cable drum having a quick release cable anchor.

Another object of the present invention is to provide a novel quick release drum cable anchor which will not release a cable end until all of the preceding cable is unwound from the drum.

A further object of the present invention is to provide a novel quick release drum cable anchor which employs the spring action of a bent cable to retain a cable end.

A still further object of the present invention is to provide a novel quick release drum cable anchor which is of simple, unitary construction but which operates effectively to provide quick cable release.

These and other objects of the present invention will become readily apparent upon a consideration of the following specification taken with the accompanying drawings in which.

Figure 1:
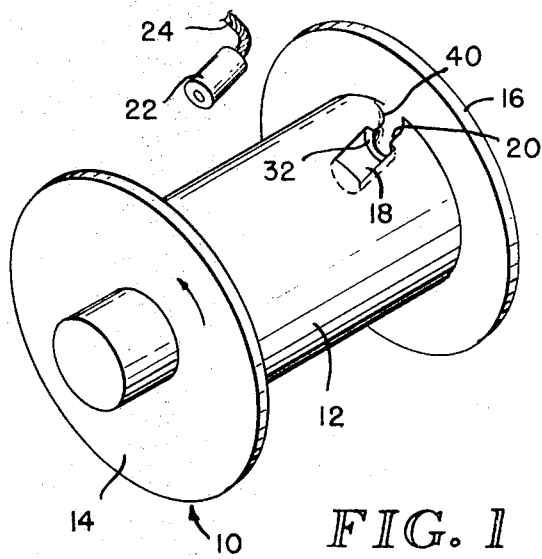
FIG. 1 is a perspective view of a cable drum with the quick release cable anchor of the present invention.

Referring now to the drawing, the cable drum with quick release cable anchor of the present invention is indicated generally at 10. This drum may constitute a winch drum or a power-driven cable drum for numerous applications, and the configuration of the drum may vary to conform with the intended use. Basically, however, the drum consists of a cable storage spool 12 to receive cable within the confines defined by two, substantially parallel spaced flanges 14 and 16 secured thereto.

The quick release anchor for a cable is formed in the spool 12 and is preferably positioned adjacent to a flange (16 in FIG. 1) so that the initial convolutions of a cable on the spool will lie against a flange. The quick release anchor includes a receiving pocket 18 and a cable departure slot 20 communicating with the receiving pocket. Both the receiving pocket and cable departure slot are cut or otherwise formed in the spool 12.

Figure 2:
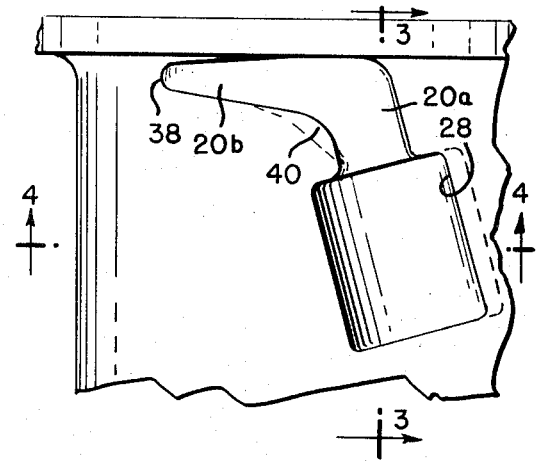
FIG. 2 is a partial plan view of the cable drum of FIG. 1 illustrating the quick release cable anchor of the present invention.

The receiving pocket 18 is positioned at an angle relative to the line of departure of a cable from the drum 10; the direction of cable departure and drum rotation for unwinding cable being indicated by the arrow in FIG. 1. The angle at which the receiving pocket is set relative to the cable line of departure is determined, to some extent, by the stiffness of the cable being used, but generally this angle should be greater than 90°. In FIG. 2, this angle is approximately 115°, and normally the angle will fall within a range between 100° and 150°.

The receiving pocket 18 is dimensioned to receive an enlargement, such as a ferrule 22 which is secured to one end of a cable 24, and generally conforms to the shape of the enlargement, which may be cylindrical. For purposes of illustration, the enlargement 22 may be formed by a cable ferrule, and the receiving pocket 18 will be hereinafter designated as a ferrule-receiving pocket. The top of the ferrule-receiving pocket is open, as indicated at 26 in FIG. 4, to facilitate insertion of the ferrule 22, but a rear shoulder 28 overlying the ferrule-receiving pocket is formed to extend along the rearward upper edge of the pocket. The end of the pocket remote from the flange 16 is closed by an end wall 30, while the opposite end wall 32 of the pocket opens into the cable departure slot 20. It will be noted in FIGS. 1 and 3 that the cable departure slot joins the ferrule-receiving pocket at a point above the bottom of the pocket. The distance 34 between the bottom of the cable departure slot at the point of entry thereof into the ferrule-retaining pocket and the bottom of the ferrule-retaining pocket is substantially equal to the distance between the outer surface of the cable 24 and the outer surface of the ferrule 22, as will be noted in FIG. 3. Preferably, the ferrule-retaining pocket is of sufficient depth to ensure that the ferrule will lie beneath the surface of the spool 12 when retained therein.

The cable departure slot 20 includes a first leg 20a which opens into the ferrule-retaining pocket 18 and a second leg 20b which is angularly disposed with relation to the first leg. Leg 20a extends angularly with respect to the line of departure of the cable 24 from the drum 10 at an angle substantially equal to that of the ferrule-retaining pocket. At a point adjacent to the flange 16, the leg 20a curves into the leg 20b which extends therefrom along the flange to define the line of departure for the cable.

Figure 3:
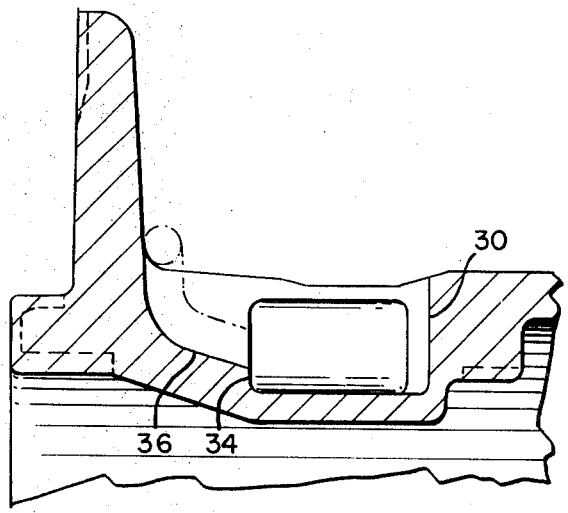
FIG. 3 is a sectional view taken along lines 3—3 of FIG. 2.
Figure 4:
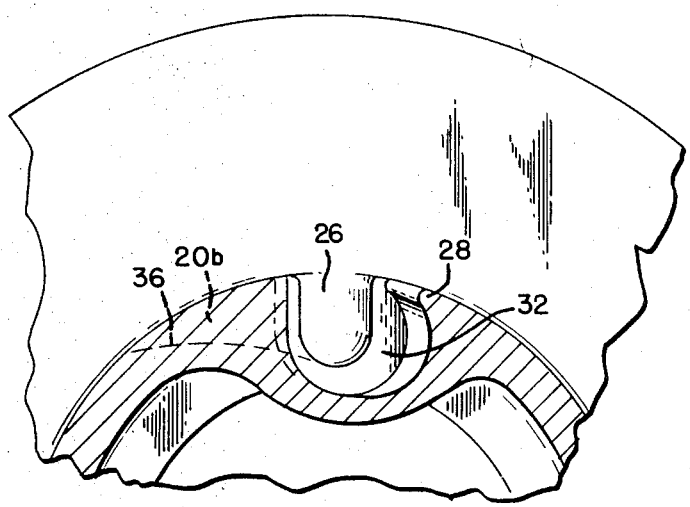
FIG. 4 is a sectional view taken along lines 4—4 of FIG. 2.

The cable departure slot 20 is open at the top and dimensioned to receive the cable 24 and to permit the cable to bend from the leg 20b into the leg 20a. The bottom wall of the cable departure slot, indicated at 36 in FIGS. 3 and 4, is of maximum depth at the entrance to the ferrule-retaining pocket and angles upwardly throughout the legs 20a and 20b to a point of minimum depth at the terminal end 38 of the leg 20b. Also, the leg 20b increases in width from the end 38 to the juncture with the leg 20a.

A forward shoulder 40, similar to the rear shoulder 28, is formed along the upper, forward edge of the leg 20a and extends for a short distance along the upper forward edge of the leg 20b. This forward shoulder overlies the cable departure slot along the section thereof where the cable bends from the leg 20a into the leg 20b.

In the operation of the cable drum with quick release cable anchor, the cable ferrule 22 and adjacent length of cable 24 are respectively inserted in the ferrule-retaining pocket 18 and cable departure slot 20. Actually, due to the natural spring tension of the cable as it is bent between the legs 20a and 20b, the cable is snapped into place beneath the forward shoulder 40 while the ferrule is snapped into place beneath the rear shoulder 28. This spring tension resulting from the tendency of the cable to straighten from the bent configuration firmly retains the ferrule and adjacent cable within the ferrule-retaining pocket and cable departure slot beneath the forward and rear shoulders thereof. The cable 24 may now be wound on the spool 12 by rotating the drum 10 in a direction opposite to the arrow in FIG. 1. The retaining effect of the cable spring tension and the forward and rear shoulders resist any tendency for the cable ferrule 22 to come out of the ferrule-retaining pocket 18.

When the drum 10 is rotated in the direction of the arrow in FIG. 1, the cable 24 will be unwound from the spool 12, and immediate cable release will be achieved as soon as, but not until, the end of the cable is reached. The forward and rear shoulders 40 and 28 operate to positively preclude premature cable release by retaining the ferrule 22 in the ferrule-retaining pocket 18 until the end of the cable is actually reached. As the cable unwinds, the cable will first be released from beneath the forward shoulder 40 which will then permit release of the ferrule from beneath the rear shoulder 28. This sequence must occur before the ferrule can move from the ferrule-retaining pocket 20.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege I claim are defined as follows:

1. A quick cable anchor for a rotatable drum having a cable spool for receiving and winding or unwinding cable, said cable being provided with an enlargement means at one end thereof, comprising a retaining pocket having an open top formed in said cable spool and dimensioned to receive said enlargement means, said retaining pocket extending laterally at an angle with relation to the line of departure of the cable from said cable spool, and a cable departure slot formed in said cable spool having an open top to receive a section of cable extending from said enlargement means, said cable departure slot including a first leg which extends substantially parallel to the line of departure of the cable from said cable spool and a second leg which extends substantially colinearly with said retaining pocket between one end of said first leg and said retaining pocket.

2. The quick release cable anchor of claim 1 wherein a rear shoulder is formed along the top rear edge of said retaining pocket, said rear shoulder being formed to project inwardly to overlie the rear portion of said pocket, and a front shoulder is formed along the top, forward edge of said cable departure slot, said forward shoulder being formed to project inwardly to extend along the overlie the juncture section of said cable departure slot where said first and second legs join.

3. The quick release cable anchor of claim 2 wherein said retaining pocket and cable departure slot are formed to a depth sufficient to permit an enlargement means and cable received therein to lie beneath said rear and front shoulders respectively beneath the surface of said cable spool 4. The quick release cable anchor of claim 2 wherein said cable departure slot decreases in depth from a point adjacent the juncture thereof with said retaining pocket to the free, terminal end of said first leg thereof.

5. The quick release cable anchor of claim 2 wherein the width of said retaining pocket is greater than the width of said cable departure slot, the width of the first leg of said cable departure slot decreasing progressively from the juncture thereof with the second leg of said departure slot.

6. The quick release cable anchor of claim 2 wherein the retaining pocket is of greater depth than said cable departure slot.

7. The quick release cable anchor of claim 2 wherein said cable drum includes a pair of spaced, substantially parallel flanges mounted upon said cable spool to retain said cable therebetween, the first leg of said cable departure slot being positioned to extend adjacent and substantially parallel to one of said flanges.

8. The quick release cable anchor of claim 7 wherein the angle between said retaining pocket and the line of departure of said cable is within the range of from 100° to 150°.

9. The quick release cable anchor of claim 8 wherein said retaining pocket and cable departure slot are formed to a depth sufficient to permit an enlargement means and cable received therein to lie beneath said rear and front shoulders respectively beneath the surface of said cable spool, said cable departure slot decreasing in depth from a point adjacent the juncture thereof with said retaining pocket to the free, terminal end of said first leg thereof.

10. The quick release cable anchor of claim 9 wherein said retaining pocket is of greater width and depth than said cable departure slot, the width of the first leg of said cable departure slot decreasing progressively from the juncture thereof with the second leg of said departure slot.